Dec. 22, 1931.  L. E. WAITE  1,837,302

WHEEL

Filed April 18, 1929

Lorenzo E. Waite
INVENTOR.

BY
ATTORNEYS.

Patented Dec. 22, 1931

1,837,302

UNITED STATES PATENT OFFICE

LORENZO E. WAITE, OF ERIE, PENNSYLVANIA, ASSIGNOR TO ERIE MALLEABLE IRON COMPANY, OF ERIE, PENNSYLVANIA, A CORPORATION OF PENNSYLVANIA

WHEEL

Application filed April 18, 1929. Serial No. 356,108.

In forming metal wheels one of the problems is to so secure the felloe to the spokes as to assure rigidity and certainty of the connection so that it will remain locked as to driving strains and as to all types of road shocks. The present invention is designed to provide such a wheel with a comparatively light felloe and one that may be readily fabricated. Features and details of the invention will appear from the specification and claims.

A preferred embodiment of the wheel is shown in the accompanying drawings as follows:—

Figure 1:
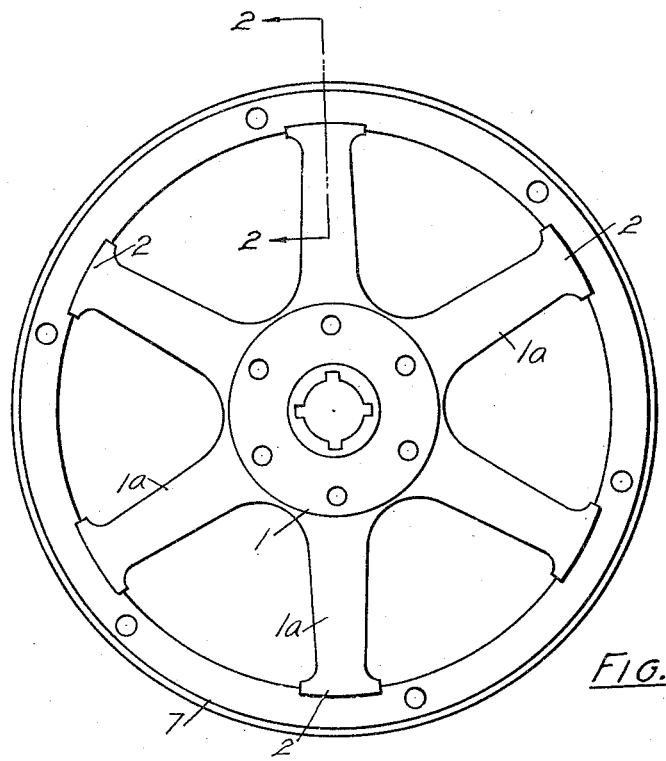

Fig. 1 shows a side elevation of the finished wheel.

Figures 2, 3:
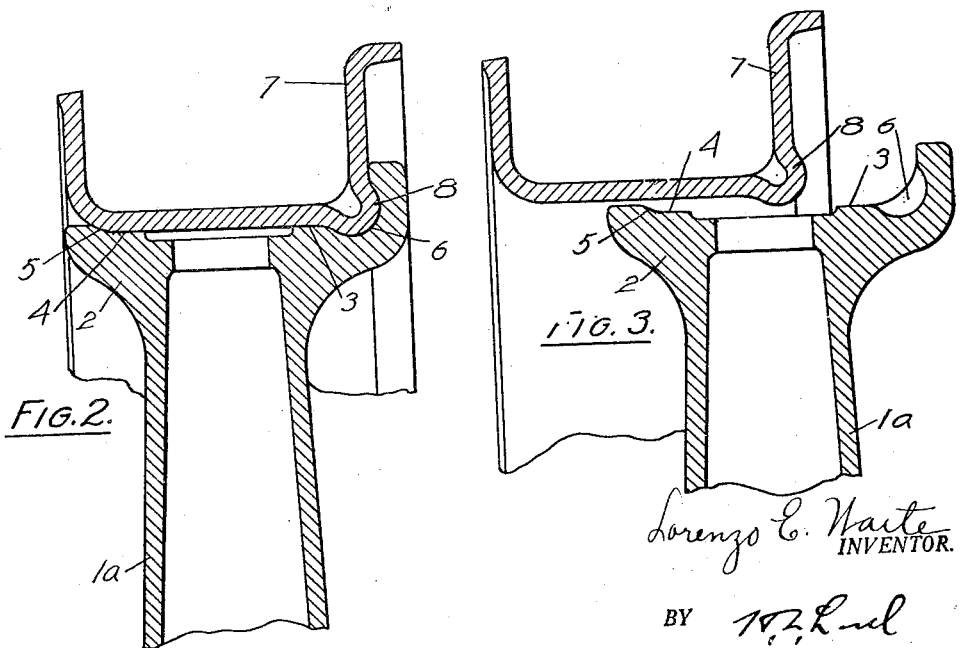

Fig. 2 an enlarged section on the line 2—2 in Fig. 1.

Fig. 3 a similar view with the felloe and wheel end in the process of assembly.

1 marks a wheel center with spokes 1a. This is ordinarily of cast metal. The spokes are provided with felloe pads 2 at their outer ends, these pads having felloe seats 3 and 4. An inwardly faced shoulder 5 is arranged just outside of the seat 4 and a locking socket 6 is arranged in the inner edge of the pad 2 along the seat 3.

A channel-shaped felloe 7 surrounds the wheel center and has protuberances 8 formed in the metal that extend into the sockets 6. The outer edge of the felloe engages the shoulder 5 supplementing the protuberances in locking the felloe in place. It will be noted that the protuberances not only extend internally but laterally into the sockets.

In forming the wheel, the wheel center is cast in the ordinary manner and the seats formed on the felloe pads. The felloe is formed with an initial diameter slightly less than that of the pads with the protuberances arranged therein. It is expanded so that it may be introduced over the shoulder 5 into place on the seats with the protuberances in place in the sockets. Upon allowing the felloe to contract it securely seats itself on the pads and locks the wheel in place with the protuberances locking the wheel as to driving strains and the sockets and shoulder holding the felloe in place. It will be noted that the rim may be assembled by moving it to its position axially with the protuberances offset circumferentially from the shoulders 5 and the felloe may then be rotated to bring the protuberances into register with the sockets. In this way the protuberances may extend inwardly beyond the seats 3 and 4 without requiring an expansion sufficient to carry the protuberances outside of the shoulders 5. This permits, therefore, of deeper sockets and larger protuberances than would be the case if it was necessary to move these in an axial direction over the shoulders.

What I claim as new is:—

1. In a wheel, the combination of a wheel center comprising spokes having felloe pads at the outer ends of said spokes, said pads having locking sockets along axial edges of the pads and inwardly faced shoulders along the opposite axial edges of the pads; and a felloe engaging said shoulders and having protuberances in the metal thereof extending into said sockets.

2. In a wheel, the combination of a wheel center comprising spokes having felloe pads at the outer ends of said spokes, said pads having locking sockets along axial edges of the pads and inwardly faced shoulders along the opposite axial edges of the pads; and a felloe engaging said shoulders and having protuberances in the metal thereof extending into said sockets, the shoulders extending radially outwardly beyond the inner surfaces of the shoulders.

In testimony whereof I have hereunto set my hand.

LORENZO E. WAITE.